(12) United States Patent
Watts et al.

(10) Patent No.: US 8,991,197 B2
(45) Date of Patent: Mar. 31, 2015

(54) THERMODYNAMIC PUMP FOR CRYOGENIC FUELED DEVICES

(71) Applicant: The Boeing Company, Chicago, IL (US)

(72) Inventors: Daniel A. Watts, Surfside, CA (US); Jason A. Grow, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/047,982

(22) Filed: Oct. 7, 2013

(65) Prior Publication Data
US 2014/0076290 A1 Mar. 20, 2014

Related U.S. Application Data

(62) Division of application No. 11/750,246, filed on May 17, 2007, now Pat. No. 8,726,676.

(51) Int. Cl.
*F17C 9/02* (2006.01)
*F25B 19/00* (2006.01)
(Continued)

(52) U.S. Cl.
CPC .............. *F02M 21/0224* (2013.01); *F17C 5/06* (2013.01); *F17C 9/02* (2013.01); *F17C 13/025* (2013.01); *F17C 13/026* (2013.01); *F17C 2205/0323* (2013.01); *F17C 2221/01* (2013.01);
(Continued)

(58) Field of Classification Search
CPC ...... F17C 9/00; F17C 9/02; F17C 2205/0323; F17C 2221/012; F17C 2221/033; F17C 2223/0161; F17C 2223/043; F17C 2225/0123; F17C 2227/0323; F17C 2227/0374; F17C 2250/01; F17C 2250/043; F17C 2250/0439; F17C 2250/0491; F17C 2250/0626; F17C 2250/0631; F17C 2260/021; F17C 2260/066; F02M 21/00; F02M 21/06; F02M 21/023; F02M 21/0233; F02M 21/0239; F02M 21/0206; F02M 21/0209; F02M 21/0218; F02M 21/0221; F02M 21/0224
USPC .......... 62/7, 45.1, 50.1, 50.2, 50.6, 47.1, 48.1, 62/48.2, 48.3
See application file for complete search history.

(56) References Cited

U.S. PATENT DOCUMENTS 2,747,374 A * 5/1956 Thompson ..................... 62/50.4
4,495,900 A * 1/1985 Stockmeyer .................. 123/1 A
(Continued)

FOREIGN PATENT DOCUMENTS

WO      2005023649      3/2005

*Primary Examiner* — Mohammad M Ali
*Assistant Examiner* — Keith Raymond
(74) *Attorney, Agent, or Firm* — Klintworth & Rozenblat IP LLC

(57) ABSTRACT

In one embodiment of the disclosure, an apparatus is provided for fueling a device using a cryogenic fluid. The apparatus may comprise: a cryogenic fluid supply container; a vessel connected to the supply container with an entrance valve to regulate flow of cryogenic fluid from the supply container; a heat transfer system capable of transferring heat from a device to the vessel to heat gas in the vessel; and an accumulator connected to the vessel with an exit valve to regulate flow of gas from the vessel to the accumulator. The accumulator may be capable of being connected to a device. In other embodiments, methods are provided of controllably mixing at least one fluid within a fluid mixing device.

18 Claims, 4 Drawing Sheets

(51) Int. Cl.
  *F17C 3/08*    (2006.01)
  *F17C 7/02*    (2006.01)
  *F17C 13/00*   (2006.01)
  *F02M 21/02*   (2006.01)
  *F17C 5/06*    (2006.01)
  *F17C 13/02*   (2006.01)
  *F02D 19/02*   (2006.01)

(52) U.S. Cl.
  CPC ....... *F17C2221/012* (2013.01); *F17C 2221/03* (2013.01); *F17C 2221/033* (2013.01); *F17C 2223/0161* (2013.01); *F17C 2223/033* (2013.01); *F17C 2223/046* (2013.01); *F17C 2225/0123* (2013.01); *F17C 2225/035* (2013.01); *F17C 2227/0135* (2013.01); *F17C 2227/0306* (2013.01); *F17C 2227/0323* (2013.01); *F17C 2227/0388* (2013.01); *F17C 2227/0393* (2013.01); *F17C 2227/047* (2013.01); *F17C 2250/01* (2013.01); *F17C 2250/043* (2013.01); *F17C 2250/0439* (2013.01); *F17C 2250/0491* (2013.01); *F17C 2250/0626* (2013.01); *F17C 2250/0631* (2013.01); *F17C 2250/075* (2013.01); *F17C 2260/021* (2013.01); *F17C 2260/035* (2013.01); *F17C 2265/066* (2013.01); *F17C 2270/0168* (2013.01); *F17C 2270/0189* (2013.01); *Y02E 60/321* (2013.01); *Y02T 10/32* (2013.01); *F02M 21/0206* (2013.01); *F02M 21/0221* (2013.01); *F02M 21/0287* (2013.01); *F02D 19/022* (2013.01); *F02D 19/027* (2013.01)
  USPC .................. 62/50.2; 62/7; 62/45.1; 62/50.1; 62/50.6

(56) References Cited

U.S. PATENT DOCUMENTS

| | | | |
|---|---|---|---|
| 5,107,906 A * | 4/1992 | Swenson et al. | 141/11 |
| 5,121,609 A | 6/1992 | Cieslukowski | |
| 5,127,230 A | 7/1992 | Neeser et al. | |
| 5,231,838 A | 8/1993 | Cieslukowski | |
| 5,325,894 A | 7/1994 | Kooy et al. | |
| 5,373,700 A | 12/1994 | McIntosh | |
| 5,537,824 A | 7/1996 | Gustafson et al. | |
| 5,590,535 A | 1/1997 | Rhoades | |
| 6,058,713 A | 5/2000 | Bowen et al. | |
| 6,354,088 B1 * | 3/2002 | Emmer et al. | 62/50.1 |
| 6,584,998 B1 | 7/2003 | Milner | |
| 6,682,413 B1 | 1/2004 | Hoffman et al. | |
| 6,816,669 B2 | 11/2004 | Zimmer et al. | |
| 6,953,045 B2 | 10/2005 | Enerson | |
| 7,044,113 B2 | 5/2006 | Bingham et al. | |
| 7,198,062 B2 | 4/2007 | Hoffman et al. | |
| 2005/0274127 A1 | 12/2005 | Drube et al. | |
| 2007/0130964 A1 | 6/2007 | Taube | |

* cited by examiner

THERMODYNAMIC PUMP FOR CRYOGENIC FUELED DEVICES

REFERENCE TO RELATED APPLICATIONS

The present disclosure is a divisional application of Ser. No. 11/750,246, filed on May 17, 2007, the disclosure of which is herein incorporated by reference in its entirety.

BACKGROUND

There is an interest in using cryogenic fluids such as liquid hydrogen, nitrous oxide, methane, or other fluids as fuel for internal combustion engines, ground vehicles, aircraft, and other devices. In order for cryogenic fluids to be used as fuel for these applications, the cryogenic fluid may need to be supplied to the engine at specific conditions. These conditions may require cryogenic fluid to be gasified, heated from its cryogenic temperatures to room temperature, and pressurized from low storage pressures to much higher operation pressures. To accomplish this state change, a mechanical pump is sometimes used to increase the pressure, accompanied by a heat exchanger to increase the temperature. However, due to the extreme cold and poor lubricity of cryogenic fluid, many mechanical pumps, which utilize rotating components, may not work well. In addition, many mechanical pumps may suffer from low efficiencies, poor reliability, and complexity. Beyond the complexity of the pump, a separate system, such as a heat exchanger, may need to be utilized to increase the temperature of the cryogenic fluid. Further, in some existing apparatus, both the pump and the heat exchanger may create a fire hazard by producing liquid air which may be flammable. Still other existing devices may use cryogenic fluid warmed in a large tank, or what is called a batch method. This may require excessive weight and size.

An apparatus, and/or method for conditioning cryogenic fluid for use in a device, is needed to decrease one or more problems associated with one or more of the existing apparatus and/or methods.

SUMMARY

In one aspect of the disclosure, a method is provided for converting cryogenic fluid for use in a device. In one step, cryogenic fluid is heated to gas using heat transferred from the device to a vessel. In another step, temperature and pressure of the gas within the vessel is controlled. In still another step, the gas within the vessel is transferred to the device.

In another aspect of the disclosure, an apparatus is provided for fueling a device using cryogenic fluid. The apparatus comprises the following: a cryogenic fluid supply container; a vessel connected to the supply container with an entrance valve to regulate flow of cryogenic fluid from the supply container to the vessel; a heat transfer system capable of transferring heat from a device to the vessel to heat gas in the vessel; and an accumulator connected to the vessel with an exit valve to regulate flow of gas from the vessel to the accumulator. The accumulator is capable of being connected to a device.

In a further aspect of the disclosure, gas fueling a device is provided. The gas was formed by heating cryogenic fluid in a vessel using heat transferred from the device. The temperature and pressure within the vessel was controlled during formation of the gas. The gas from the vessel was transferred to the device.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
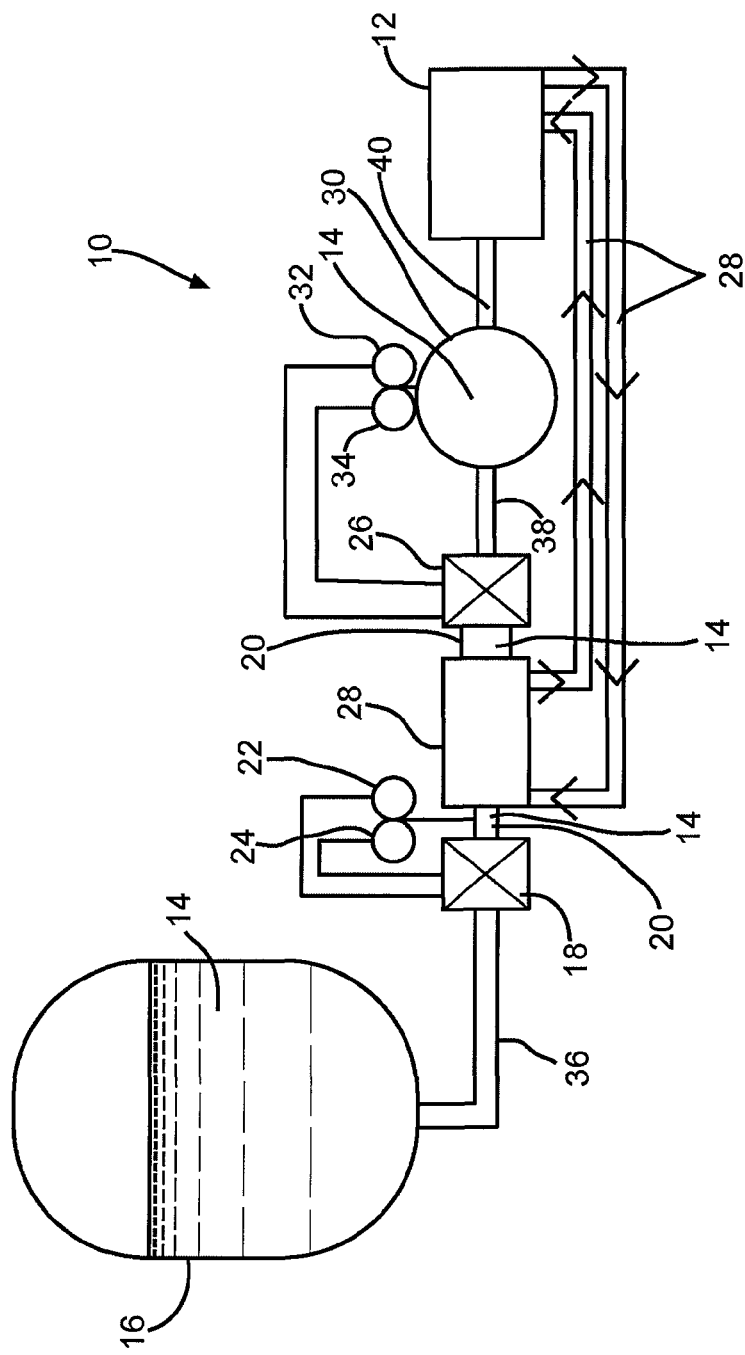
FIG. 1 shows a front view of one embodiment of an apparatus for fueling a device using hydrogen.

FIG. 1 shows a front view of one embodiment of an apparatus 10 which supplies hydrogen fuel 14 to device 12. The device 12 being fueled may comprise an aircraft, a vehicle, an internal combustion engine, and/or another type of hydrogen fueled device. The apparatus 10 may comprise a thermodynamic pump. The apparatus 10 may include a liquid hydrogen supply container 16, an entrance valve 18, a vessel 20, a first temperature sensor 22, a first pressure sensor 24, an exit valve 26, a heat transfer system 28, an accumulator 30, a second temperature sensor 32, and a second pressure sensor 34.

The liquid hydrogen supply container 16 may contain hydrogen 14 in a liquid state, and may be connected through one or more pipes 36 to the entrance valve 18 which may be connected to the vessel 20. The vessel 20 may comprise a pipe or other type of vessel in which a liquid or gas may be contained. In one embodiment, the vessel 20 may comprise a 3 foot long pipe having a 2 to 5 inch diameter. In other embodiments, varying sized vessels 20 may be used depending on the hydrogen demand of the device 12. For instance, in one embodiment, two or more vessels 20 may be used in parallel and manifolded together, and the accumulator 30 may be replaced by a manifold downstream of exit valve 26.

The entrance valve 18 may be adapted to open to allow hydrogen 14 in a liquid state to be transferred from the supply container 16 into vessel 20. The latent heat of vessel 20 may cause the hydrogen 14 supplied from the supply container 16 to vaporize and mix with residual warm hydrogen gas in vessel 20. Continued contact of the hydrogen in vessel 20 with the hydrogen at valve 18 may reduce the temperature of the gaseous hydrogen in vessel 20 to near liquid hydrogen temperatures. Once the desired temperature of the hydrogen in vessel 20 is reached, valve 18 may be closed to lock near liquid hydrogen temperature gaseous hydrogen in vessel 20 to be heated using a heat transfer system 28.

The heat transfer system 28 may comprise one or more continuous closed loop pipes which are connected between the vessel 20 and a connected device 12. The heat transfer system 28 may allow heat from the connected device 12, in the form of heated device coolant or in another form, to be transferred to the vessel 20 in order to heat the hydrogen 14 within the vessel 20 to a warm higher pressure gas. The first temperature sensor 22 and the first pressure sensor 24 may be connected to the vessel 20 in order to monitor the temperature and pressure of the hydrogen 14 within the vessel 20 in both liquid and gaseous states. The vessel 20 may be connected to the exit valve 26. The exit valve 26 may be adapted to close to lock hydrogen 14 in a near liquid hydrogen temperature gas state within the vessel 20 so that it can be heated to a high pressure warm state, to open to allow hydrogen 14 in a gaseous state to be transferred to the accumulator 30, and to close to prevent more hydrogen 14 in a gaseous state to enter the accumulator 30. The exit valve 26 may be connected to the accumulator 30 through one or more pipes 38. The second temperature sensor 32 and the second pressure sensor 34 may be connected to the accumulator 30 in order to monitor the temperature and pressure of the hydrogen 14 in a gaseous state within the accumulator 30. The accumulator 30 may be adapted to store the hydrogen 14 in a gaseous state within the accumulator 30 until the device 12 requires hydrogen fueling. The accumulator 30 may be connected through one or more pipes 40 to the device 12 to allow hydrogen 14 in a gaseous state to be transferred to the device 12 in order to fuel the device 12.

In one embodiment, when the apparatus 10 of FIG. 1 is in operation, the entrance valve 18 may be opened to allow hydrogen 14 in a liquid state to be transferred from the liquid hydrogen supply container 16 to the vessel 20 while the exit valve 26 is closed. After enough hydrogen 14 in a liquid state is transferred into the vessel 20, the entrance valve 18 may be closed. The heat transfer system 28 may then transfer heat from the connected device 12 to the vessel 20, in order to heat the hydrogen 14 within the vessel 20 from a liquid to a gaseous state. At any time, if the first temperature sensor 22 and/or the first pressure sensor 24 detect a temperature and/or pressure within the vessel 20 above a first set-amount, indicating that the temperature and/or pressure within the vessel 20 is too high, the entrance valve 18 may be opened to allow more hydrogen 14 in a liquid state to be transferred into the vessel 20 to lower the temperature and/or pressure within the vessel 20. In such manner, catastrophic failure due to over-pressurization within the vessel 20 may be avoided without having to vent hydrogen 14 in a gaseous state. The entrance valve 18 may then be closed.

Similarly, if the first temperature sensor 22 and/or the first pressure sensor 24 detect a temperature and/or pressure within the vessel 20 above a first set-amount, indicating that the temperature and/or pressure within the vessel 20 is too high, the exit valve 26 may be opened to allow hydrogen 14 in a gaseous state to be transferred from the vessel 20 to the accumulator 30 in order to lower the temperature and/or pressure within the vessel 20. Likewise, when the first temperature sensor 22 and/or the first pressure sensor 24 detect a temperature and/or pressure within the vessel 20 which indicates that the hydrogen 14 within the vessel is in a suitable gaseous state, the exit valve 26 may be opened to allow the hydrogen 14 in a gaseous state to be transferred to the accumulator 30.

When enough hydrogen 14 in a gaseous state has been accumulated in the accumulator 30, the exit valve 26 may be closed. When the second temperature sensor 32 and/or the second pressure sensor 34 detect a temperature and/or pressure within the accumulator 30 indicating that the hydrogen 14 within the accumulator 30 is in a suitable gaseous state to fuel the connected device 12, the accumulator 30 may transfer hydrogen 14 in a gaseous state to the connected device 12. If the second temperature sensor 32 and/or the second pressure sensor 34 detect that the temperature and/or pressure within the accumulator 30 is below a second set-amount, the exit valve 26 may be opened to allow more hydrogen 14, which has been heated within the vessel 20 to a gaseous state, to be transferred into the accumulator 30 to increase the temperature and/or pressure of the hydrogen 14 within the accumulator 30.

Figure 2:
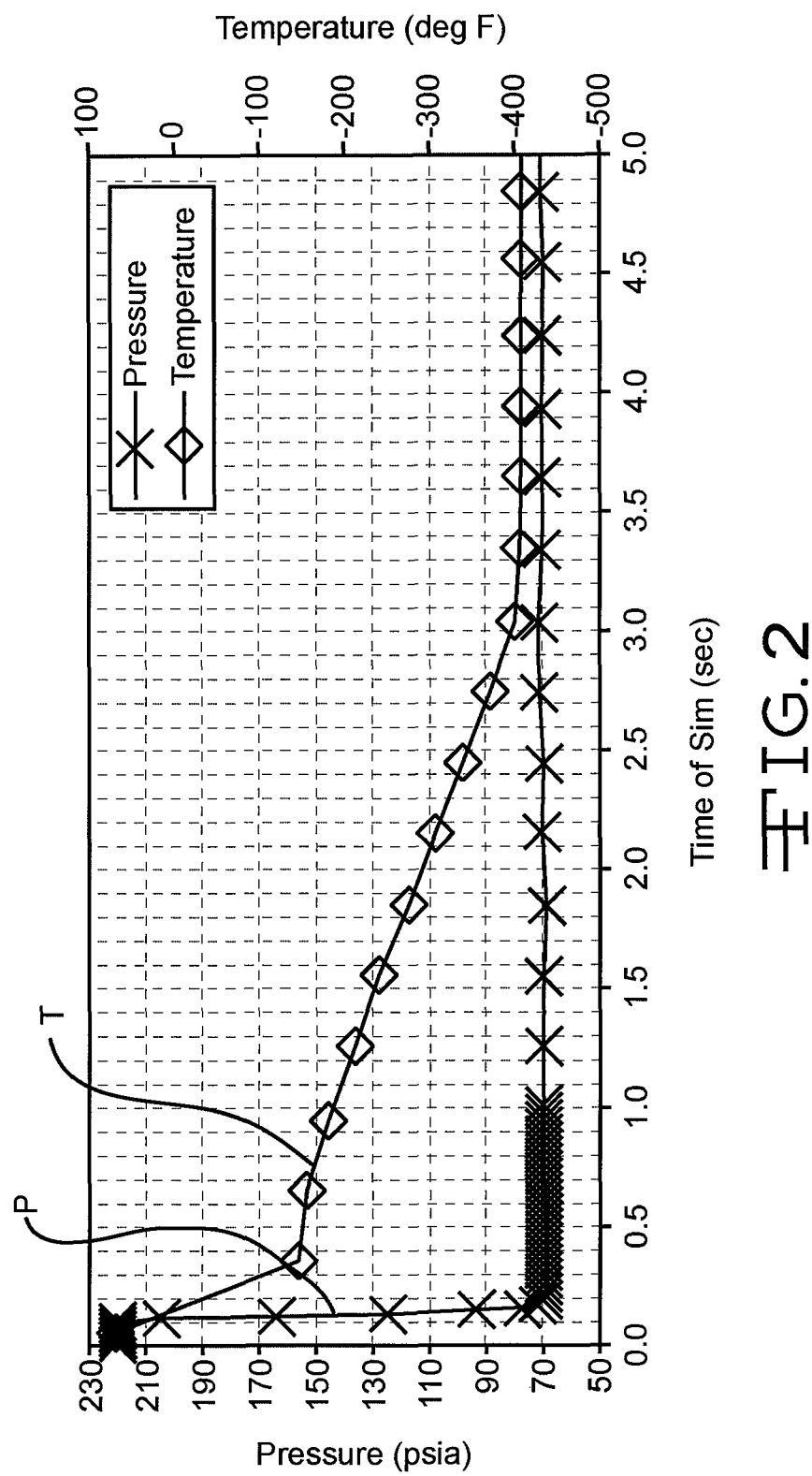
FIG. 2 is a graph showing the pressure and the temperature inside one embodiment of a vessel when an entrance valve is opened as a function of time.
Figure 3:
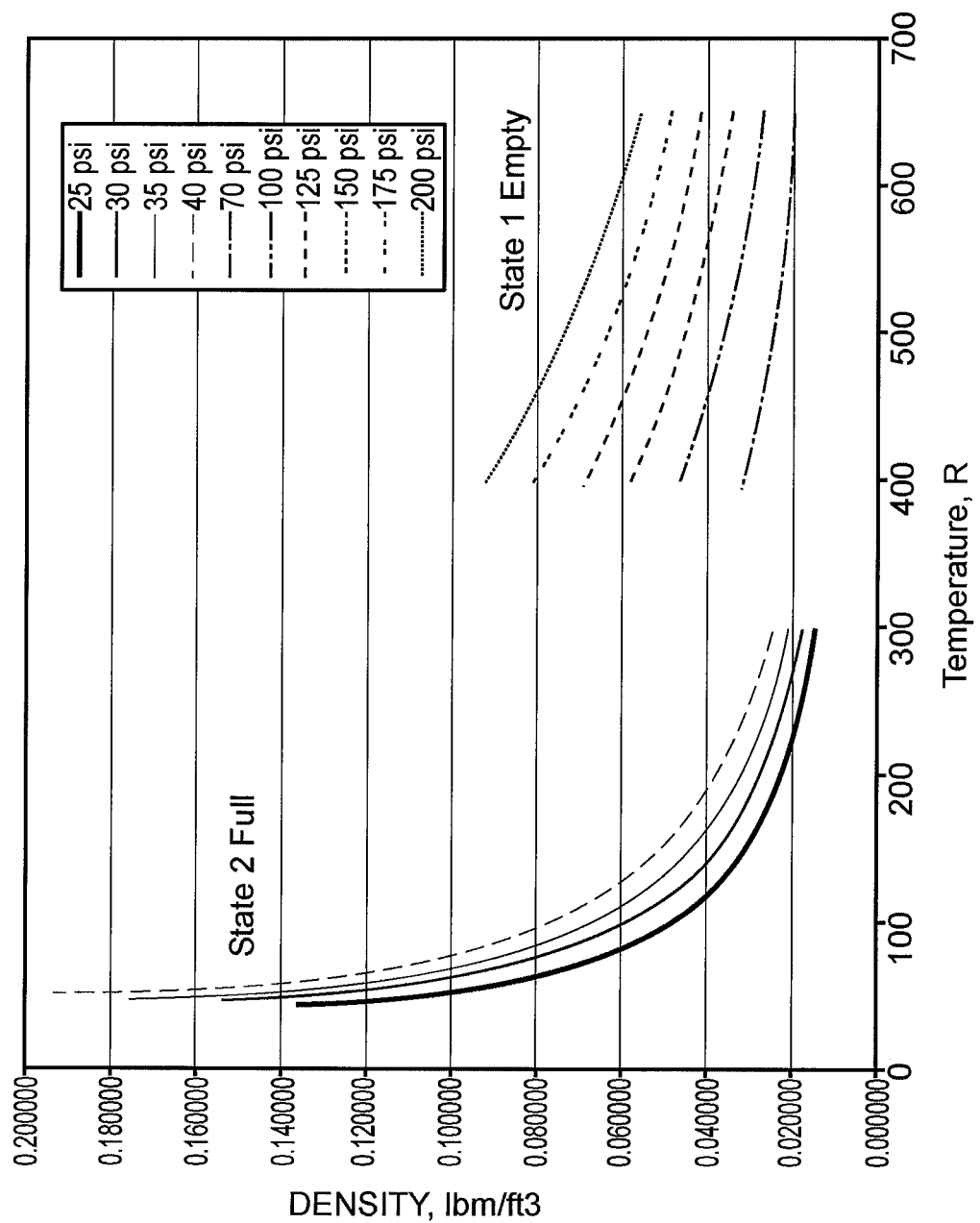
FIG. 3 is a graph showing the operating range of density versus temperature for various pressures within one embodiment of a vessel.

When the vessel 20 needs to be recharged, the entrance valve 18 may be opened to allow hydrogen 14 in a liquid state to be transferred to the vessel 20 from the supply container 16. The pressure within the vessel 20 may initially drop which will may allow some of the hydrogen 14 in a liquid form to flow inside the vessel 20. The hydrogen 14 in a liquid form may vaporize as it enters the vessel 20 but at a much lower temperature than the temperature within the vessel 20. FIG. 2 is a graph showing the pressure P and the temperature T inside one embodiment of the vessel 20 when the entrance valve 18 is opened as a function of time. The net result may be an increase in density (and increase in mass) inside the vessel 20 showing a net positive mass flow through the vessel 20. The exit valve 26 may then be closed to allow the hydrogen 14 within the vessel 20 to be heated to a gaseous state, during which the pressure inside the vessel 20 may rise substantially. In one embodiment where the vessel 20 is 3 feet long and 5 inches in diameter, due to the small size of the vessel 20, the pressure may exceed 1000 psia. FIG. 3 is a graph showing the operating range of density versus temperature for various pressures within one embodiment of a vessel 20.

The apparatus 10 of FIG. 1 may not utilize any vents for lowering temperature and/or pressure of the hydrogen 14 within the vessel 20. This may help to avoid wasting hydrogen 14 as a result of venting. Instead, over pressure and/or temperature protection may be provided by the ability of the apparatus 10 to depressurize and/or lower the temperature of the hydrogen 14 within the vessel 20 utilizing the hydrogen 14 within the upstream liquid supply container 16. Moreover, the apparatus 10 may avoid the use of high speed rotational parts. Rather, pressure and/or temperature within the vessel 20 may be achieved utilizing excess heat from the device 12 itself. Rather than utilizing a large number of movable parts, the only movable parts the apparatus 10 may use may be the entrance and exit valves 18 and 26, which may help reliability and durability. The non-flowing gasification process of the apparatus 10 may result in a stable supply of hydrogen 14 for the device 12, as opposed to a typical heat exchanger where the hydrogen may flow through the heat exchanger potentially creating an unsteady supply by causing ice to form in the heating fluid side of the heat exchanger. The closed-loop nature of the apparatus 10 may mitigate the risk of liquid air formation within the apparatus 10. The apparatus 10 may be able to handle a relatively wide range of flow rates and pressures to accommodate for the hydrogen requirements of the device 12.

Figure 4:
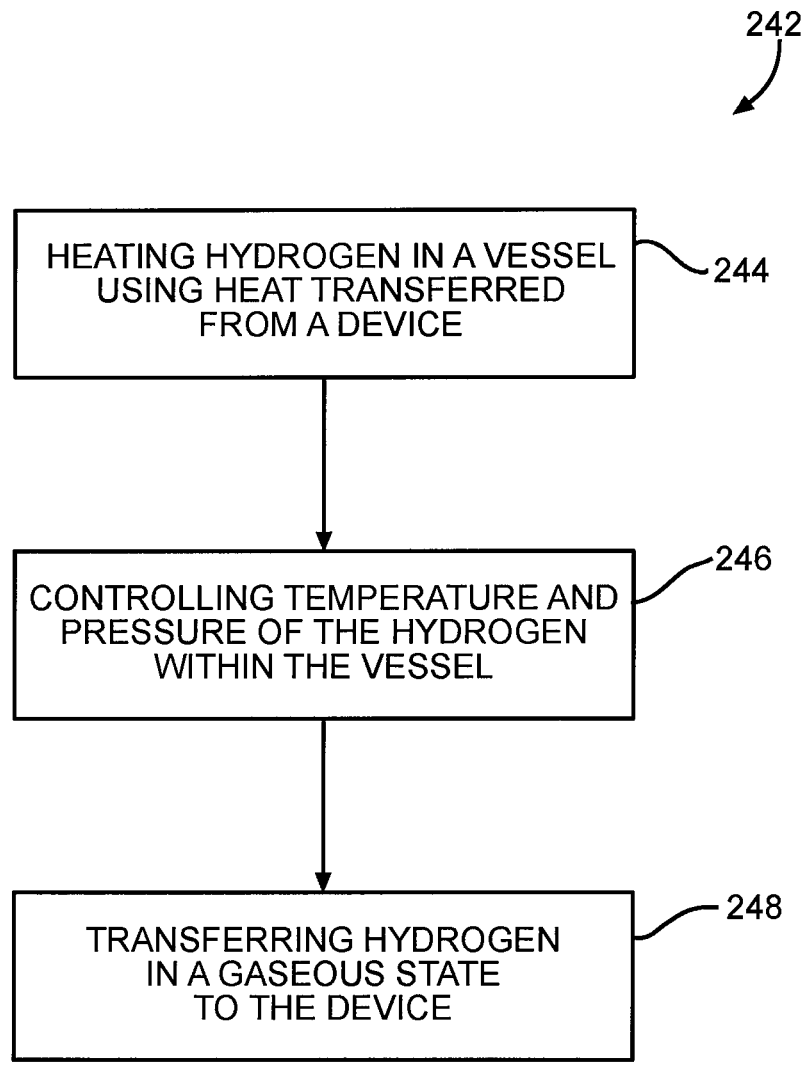
FIG. 4 is a flowchart showing one embodiment of a method for converting a cryogenic fluid such as hydrogen in a liquid state for use in a device.

FIG. 4 is a flowchart showing one embodiment of a method 242 for converting hydrogen 14 in a liquid state for use in a device 12. The device 12 may comprise an internal combustion engine, an aircraft, a vehicle, or other type of device. In one step 244, hydrogen 14 in a liquid state in a vessel 20 may be heated to a gaseous state using heat transferred from the device 12. In one embodiment, a size of the vessel 20 may be determined based on the requirements of the device 12. In another step 246, temperature and pressure of the hydrogen 14 within the vessel 20 may be controlled. In one embodiment, a first temperature sensor 22 and a first pressure sensor 24 may be used to control the temperature and pressure of the hydrogen 14 within the vessel 20. In another embodiment, hydrogen 14 in a liquid state may be transferred from a supply container 16 to the vessel 20 when at least one of the temperature and pressure of the hydrogen 14 within the vessel 20 is over a first set-amount. The method 242 may not utilize any vents to lower at least of the temperature and pressure of the hydrogen 14 within the vessel 20. In another embodiment, hydrogen 14 in the vessel 20 may be heated using heat transferred from the device 12 when at least one of the temperature and pressure of the hydrogen 14 within the vessel 20 is under a third set-amount. In still another step 248, hydrogen 14 in a gaseous state within the vessel 20 may be transferred to the device 12. In one embodiment, hydrogen 14 in a gaseous state within the vessel 20 may be first transferred to an accumulator 30, and then transferred to the device 12.

In another embodiment, additional steps of the method 242 may comprise providing a supply container 16, and transferring hydrogen 14 in a liquid state from the supply container to the vessel 20. Still other steps may comprise providing an entrance valve 18 to the vessel 20, providing an exit valve 26 to the vessel 20, and heating the hydrogen 14 in a liquid state within the vessel 20 to a gaseous state while both of the entrance and exit valves 18 and 26 are closed. The entrance valve 18 may be connected to a liquid hydrogen supply container 16, and the exit valve 26 may be connected to an accumulator 30 which may be connected to the device 12. In yet another embodiment, an additional step of the method 242 may comprise controlling the temperature and pressure of hydrogen 14 in a gaseous state within the accumulator 30. A second temperature sensor 32 and a second pressure sensor 34 may be used to control the temperature and pressure of hydrogen 14 in a gaseous state within the accumulator 30. When at least of the temperature and pressure of the hydrogen 14 in a gaseous state within the accumulator 30 is under a second set-amount, additional hydrogen 14 in a gaseous state may be transferred from the vessel 20 to the accumulator 30.

In an additional embodiment, hydrogen 14 fueling a device 12, while in a gaseous state, may be provided. The hydrogen 14 in the gaseous state may have been formed by heating hydrogen 14 in a liquid state in a vessel 20 to a gaseous state using heat transferred from the device 12. The temperature and pressure within the vessel 20 may have been controlled during formation of the hydrogen 14 into the gaseous state. The hydrogen 14 in the gaseous state may have been transferred to the device 12. The device 12 being fueled may be at least one of an internal combustion engine, an aircraft, a vehicle and another type of fueled device.

Although the above embodiments are directed towards using hydrogen 14 to fuel the device 12, all of the embodiments of the disclosure are equally applicable to using another type of cryogenic fluid rather than hydrogen, such as nitrous oxide, methane, or other type of very low temperature or substantially low temperature fluid to fuel the device 12.

One or more embodiments of the disclosure may reduce and/or eliminate one or more problems of one or more of the existing apparatus and/or methods. For instance, one or more embodiments of the apparatus and/or method of the disclosure may reduce the need for high speed rotational parts, reduce the need for moving parts other than valves, reduce hydrogen waste due to venting, provide a more stable supply of hydrogen, help in mitigating the risk of liquid air formation, more easily handle a wide range of flow rates and pressures depending on the hydrogen requirements, increase durability, increase reliability, take up less space, take up less weight, be less costly, decrease hydrogen loss, be more stable, accommodate a wide range of devices, mitigate liquid air formation, be more efficient, be easier to implement, and/or may reduce one or more other types of problems with one or more of the existing apparatus and/or methods.

It should be understood, of course, that the foregoing relates to exemplary embodiments of the disclosure and that modifications may be made without departing from the spirit and scope of the disclosure as set forth in the following claims.

The invention claimed is:

1. An apparatus for fueling a device using cryogenic fluid comprising:
   a cryogenic fluid supply container configured to supply a cryogenic fluid;
   a vessel connected to the cryogenic fluid supply container with an entrance valve configured to regulate flow of the cryogenic fluid from the cryogenic fluid supply container into the vessel;
   a device;
   a heat transfer system configured to transfer heat, while the vessel is being supplied with the cryogenic fluid from the cryogenic fluid supply container, from the device to the vessel to vaporize the cryogenic fluid in the vessel, supplied by the cryogenic fluid supply container, into the cryogenic gas;
   an exit valve configured to regulate flow of the cryogenic gas from the vessel to fuel the device with the cryogenic gas, wherein the cryogenic fluid and the cryogenic gas are not vented to atmosphere or to the cryogenic fluid supply container; and
   a control system controlling the entrance valve, the control system programmed so that when a temperature or a pressure of the cryogenic gas within the vessel is over a set-amount, caused by the heat transfer system, the control system opens the entrance valve to transfer more cryogenic fluid from the cryogenic fluid supply container into the vessel.

2. The apparatus of claim 1 wherein the device comprises an aircraft, a vehicle, or an internal combustion engine.

3. The apparatus of claim 1 wherein the vessel is connected to a pressure sensor and to a temperature sensor which are configured to monitor the pressure and the temperature within the vessel.

4. The apparatus of claim 1 wherein the heat transfer system comprises at least one pipe member.

5. The apparatus of claim 1 further comprising an accumulator connected to the exit valve and to the device, wherein the accumulator is connected to a pressure sensor and to a temperature sensor which are configured to monitor the pressure and the temperature within the accumulator.

6. The apparatus of claim 5 wherein the control system is programmed to open the exit valve when the temperature or the pressure within the accumulator is below the set-amount.

7. The apparatus of claim 1 wherein the control system is programmed to close both the entrance and exit valves during transfer of the heat from the device to the vessel to vaporize the cryogenic fluid in the vessel into the cryogenic gas.

8. An apparatus for fueling a device using cryogenic fluid comprising:
   a cryogenic fluid supply container configured to supply a cryogenic fluid;
   a vessel connected to the cryogenic fluid supply container with an entrance valve configured to regulate flow of the cryogenic fluid from the cryogenic fluid supply container into the vessel;
   a device;
   a heat transfer system configured to transfer heat, while the vessel is being supplied with the cryogenic fluid from the cryogenic fluid supply container, from the device to the vessel to vaporize the cryogenic fluid in the vessel, supplied by the cryogenic fluid supply container, into the cryogenic gas;

an accumulator connected to the vessel with an exit valve configured to regulate flow of the cryogenic gas from the vessel into the accumulator to fuel the device with the cryogenic gas, wherein the cryogenic fluid and the cryogenic gas are not vented to atmosphere or to the cryogenic fluid supply container; and a control system controlling the entrance valve, the control system programmed so that when a temperature or a pressure of the cryogenic gas within the vessel is over a set-amount, caused by the heat transfer system, the control system opens the entrance valve to transfer more cryogenic fluid from the cryogenic fluid supply container into the vessel.

9. The apparatus of claim 8 wherein the device comprises an aircraft, a vehicle, or an internal combustion engine.

10. The apparatus of claim 8 wherein the vessel is connected to a pressure sensor and to a temperature sensor which are configured to monitor the pressure and the temperature within the vessel.

11. The apparatus of claim 8 wherein the heat transfer system comprises at least one pipe member.

12. The apparatus of claim 8 wherein the accumulator is connected to a pressure sensor and to a temperature sensor which are configured to monitor the pressure and the temperature within the accumulator.

13. The apparatus of claim 8 wherein the control system is programmed to open the exit valve when the temperature or the pressure within the accumulator is below the set-amount.

14. The apparatus of claim 8 wherein the control system is programmed to close both the entrance and exit valves during transfer of the heat from the device to the vessel to vaporize the cryogenic fluid in the vessel into the cryogenic gas.

15. An apparatus for fueling a device using cryogenic fluid comprising:

a cryogenic fluid supply container configured to supply a cryogenic fluid;

a vessel connected to the cryogenic fluid supply container with an entrance device configured to regulate flow of the cryogenic fluid from the cryogenic fluid supply container into the vessel;

a device;

a heat transfer system configured to transfer heat, while the vessel is being supplied with the cryogenic fluid from the cryogenic fluid supply container, from the device to the vessel to vaporize the cryogenic fluid in the vessel, supplied by the cryogenic fluid supply container, into the cryogenic gas;

an exit device configured to regulate flow of the cryogenic gas from the vessel to fuel the device with the cryogenic gas, wherein the cryogenic fluid and the cryogenic gas are not vented to atmosphere or to the cryogenic fluid supply container; and a control system controlling the entrance device, the control system programmed so that when a temperature or a pressure of the cryogenic gas within the vessel is over a set-amount, caused by the heat transfer system, the control system opens the entrance device to transfer more cryogenic fluid from the cryogenic fluid supply container into the vessel.

16. The apparatus of claim 15 wherein the entrance device comprises an entrance valve.

17. The apparatus of claim 15 wherein the exit device comprises an exit valve.

18. The apparatus of claim 15 wherein the device comprises an aircraft, a vehicle, or an internal combustion engine.

* * * * *